(12) United States Patent
Johnson et al.

(10) Patent No.: US 11,134,651 B2
(45) Date of Patent: Oct. 5, 2021

(54) DUAL AUGER INTERNAL CLEAN-IN-PLACE BEARING

(71) Applicant: Tetra Laval Holdings & Finance S.A., Pully (CH)

(72) Inventors: Kyle Johnson, Chanhassen, MN (US); Michael Olson, Montrose, MN (US)

(73) Assignee: Tetra Laval Holdings & Finance S.A., Pully (CH)

( * ) Notice: Subject to any disclaimer, the term of this patent is extended or adjusted under 35 U.S.C. 154(b) by 468 days.

(21) Appl. No.: 16/233,155

(22) Filed: Dec. 27, 2018

(65) Prior Publication Data

US 2020/0205366 A1    Jul. 2, 2020

(51) Int. Cl.
| | |
|---|---|
| *A01J 25/00* | (2006.01) |
| *A23C 19/084* | (2006.01) |
| *A01J 25/12* | (2006.01) |
| *B65G 45/00* | (2006.01) |
| *B65G 33/18* | (2006.01) |
| *B65G 33/32* | (2006.01) |

(52) U.S. Cl.
CPC .......... *A01J 25/008* (2013.01); *A01J 25/002* (2013.01); *A01J 25/126* (2013.01); *A23C 19/084* (2013.01); *B65G 33/18* (2013.01); *B65G 33/32* (2013.01); *B65G 45/005* (2013.01); *A01J 25/12* (2013.01); *B01F 2215/0018* (2013.01)

(58) Field of Classification Search
CPC ...... A01J 25/008; A01J 25/126; A01J 25/002; A01J 25/12; A01J 25/112; A01J 25/08; A01J 25/10; B65G 45/005; B65G 33/18; B65G 33/32; A23C 19/084; B01F 2215/0018

USPC .......................................... 198/669, 666, 672
See application file for complete search history.

(56) References Cited

U.S. PATENT DOCUMENTS

| | | | | | |
|---|---|---|---|---|---|
| 3,272,317 | A | * | 9/1966 | Kelly ..................... | B65G 33/32 198/666 |
| 3,289,819 | A | * | 12/1966 | Steinmetz .............. | B65G 33/32 198/666 |
| 3,531,297 | A | * | 9/1970 | Kielsmeier ........... | A01J 25/008 426/582 |

(Continued)

FOREIGN PATENT DOCUMENTS

EP    3673730 A1 *   7/2020   ........... A23C 19/084

OTHER PUBLICATIONS

CN 108001967 A, DERWENTACC-No. 2018-378887, (Year: 2018).*

*Primary Examiner* — Mark A Deuble
(74) *Attorney, Agent, or Firm* — Renner, Otto, Boisselle & Sklar, LLP

(57) ABSTRACT

An auger assembly (1) for receiving and conveying cheese curd downstream along a cheese processing line (32) includes an auger housing (2), a first auger (3) having a first shaft (5) extending through the auger housing (2), a second auger (4) having a second shaft (6) extending through the auger housing (2) and arranged colinearly with the first shaft (5), a first bearing (9) mounted to the auger housing (2) and arranged at the end (7) of the first shaft (5), and a second bearing (10) mounted to the auger housing (2) and arranged at the end (8) of the second shaft (6). The first bearing (9) and second bearing (10) are colinear and facing each other. At least one slotted groove (11, 12) is formed the bearings (9, 10) to enable a cleaning fluid to contact a surface (13, 14) of the respective bearing (9, 10).

15 Claims, 6 Drawing Sheets

(56) References Cited

U.S. PATENT DOCUMENTS

| | | | | |
|---|---|---|---|---|
| 3,713,220 A | * | 1/1973 | Kielsmeier | A23C 19/0684 |
| | | | | 99/459 |
| 4,384,643 A | * | 5/1983 | Cone | F16C 35/02 |
| | | | | 198/672 |
| 4,815,585 A | * | 3/1989 | May | B65G 33/32 |
| | | | | 198/672 |
| 2012/0097048 A1 | * | 4/2012 | Tomatis | A01J 25/008 |
| | | | | 99/453 |

* cited by examiner

DUAL AUGER INTERNAL CLEAN-IN-PLACE BEARING

TECHNICAL FIELD

The invention relates to a method and assembly for receiving and conveying particles of cheese curd downstream along a cheese processing line, where augers are used to receive and convey the cheese particles.

TECHNICAL BACKGROUND

Different types of cheese may be produced using different types of production processes. For example, a production process for producing cheddar cheese may include cheddaring, milling, and salting of particles of cheese curd. Salting the cheese curd advantageously causes more moisture to be expelled from the curd. The production process for a producing cheddar cheese may include using a cheddaring machine that includes a plurality of conveyors. A first conveyor is configured to receive a curd mixture that has been drained of whey. The curd then travels downstream to additional conveyors for matting, fusing, and cheddaring. The curd is then moved further downstream where the curd is milled to chips or stirred depending on the type of cheese to be produced. For example, producing a Colby type of cheese may require stirred curd. The curd may then be salted while being conveyed to a final conveyor for mellowing.

The conveyors of the cheddaring machine used during the draining, salting, and/or mellowing processes may be auger-type conveyors. Cleaning the augers is generally performed using a plurality of spray nozzles that randomly spray along the auger. However, conventional spray nozzles used to clean the augers may not be suitable for thoroughly cleaning and sanitizing all of the components of the auger, particularly in narrow regions where auger bearings and other components are located. Conventional spray nozzles are disadvantageous in that the augers may require manual disassembly and removal of the components for cleaning, which is also known as a clean out of place (COP) system.

SUMMARY

It is an object of the invention to at least partly overcome one or more limitations of the prior art. In particular, it is an object to provide an auger assembly that is configured to enable a clean-in-place (CIP) fluid to contact the surfaces of adjacent bearings of the auger assemblies during operation of the auger assembly.

According to an aspect of the invention, an auger assembly is used for receiving particles of cheese curd and conveying the particles of cheese curd downstream along a cheese processing line. The auger assembly includes an auger housing, a first auger having a first shaft extending through the auger housing, a second auger having a second shaft extending through the auger housing and arranged colinearly with the first shaft, a first bearing mounted to the auger housing and arranged at the end of the first shaft, and a second bearing mounted to the auger housing and arranged at the end of the second shaft. The second shaft has an end that faces an end of the first shaft, and the first bearing and second bearing are colinear and face each other. At least one slotted groove is formed in each of the first bearing and the second bearing to enable a cleaning fluid to contact a surface of the respective bearing.

The auger assembly described herein is advantageous in enabling a CIP system which directs cleaning fluid to the bearings of the shafts. The CIP fluid is introduced down the rotatable shafts of each auger to flood the area where the bearings are located with the CIP fluid. The bearings are connected to the shafts with a slip fit connection and the slotted grooves enable the CIP fluid to travel down the shafts through the grooves to cover the area where the connection between the bearings and the shafts is formed. Using the grooves and a CIP system, which may be automated, reduces the burden of cleaning the auger assembly as compared with manual, clean out of place (COP) systems in which the auger assembly is disassembled for cleaning bearings.

According to another aspect of the invention, a method for operating an auger assembly arranged to rotate a first auger and a second auger to convey cheese curd downstream along a cheese processing line includes supplying particles of cheese curd to the first auger and the second auger that are colinearly arranged, driving a first shaft of the first auger and a second shaft of the second auger, expelling the particles of cheese curd through outlets at an end of the first auger and at an end of the second auger to convey the particles of cheese curd downstream along the cheese processing line, and supplying a cleaning fluid directly to bearings in the first and second auger that are arranged for mounting the first and second shaft within an auger housing.

Although various aspects of the invention are set out in the accompanying independent claims, other aspects of the invention may include any combination of features from the described features and/or the accompanying dependent claims with the features of the independent claims, and not only the combinations explicitly set out in the accompanying claims.

BRIEF DESCRIPTION OF THE DRAWINGS

Features of the invention will now be described, by way of example, with reference to the accompanying schematic drawings, where.

DETAILED DESCRIPTION

Figure 1:
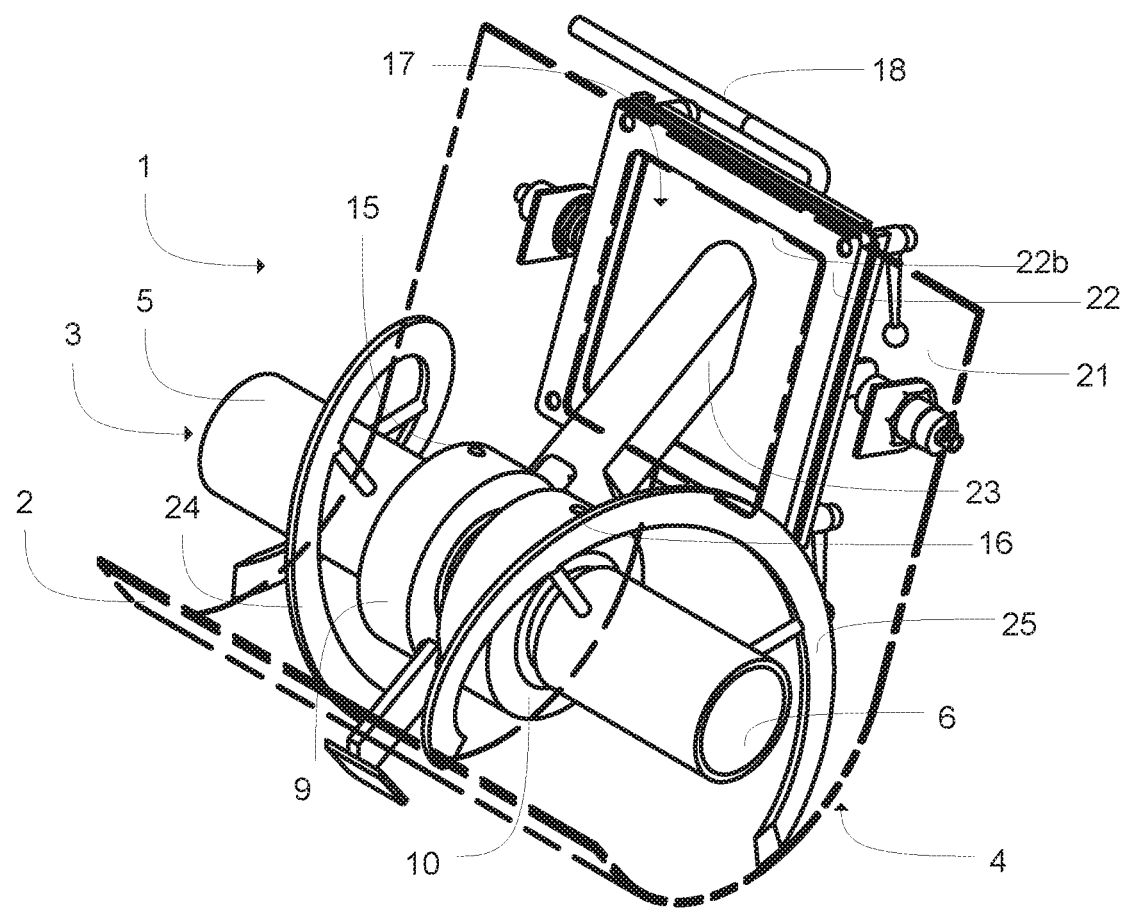
FIG. 1 is a perspective view of an auger assembly for receiving particles of cheese curd and conveying the particles of cheese curd downstream along a cheese processing line.

The method and system according to the present invention has particular application in a cheese processing line that uses conveyors, such as auger-type conveyors for receiving particles of cheese curd and conveying the particles of cheese curd downstream along a cheese processing line. Augers may be used at various stages along a cheese processing line configured for producing a cheddar type of cheese. For example, augers may be used to convey the cheese curd during the draining, salting, and/or mellowing stages of cheese production. Other types of cheese production lines may also use augers for producing types of cheeses other than cheddar.

The method and assembly use an auger assembly for receiving particles of cheese curd and conveying the particles of cheese curd downstream along a cheese processing line. The auger assembly includes an auger housing, a first auger having a first shaft extending through the auger housing, a second auger having a second shaft extending through the auger housing and arranged colinearly with the first shaft, a first bearing mounted to the auger housing and arranged at the end of the first shaft, and a second bearing mounted to the auger housing and arranged at the end of the second shaft. The second shaft has an end that faces an end of the first shaft, and the first bearing and second bearing are colinear and facing each other.

Advantageously, a slotted groove is formed in each of the bearings to enable a clean in place (CIP) fluid to contact surfaces of the bearings, such that cleaning of the bearings is ensured. The slotted grooves may extend through an entire longitudinal length of the bearings to enable the CIP fluid to travel along the auger shafts by way of the grooves and across the area where the bearings are connected with the shafts. The bearings are also removably mounted to a housing of the auger assembly using a mounting bracket which also supports the CIP fluid line to direct the CIP fluid to the slotted grooves. Thus, the bearings are easily replaceable within the auger assembly. Using the bearings and CIP system enables cleaning during normal operation of the auger assembly which subsequently improves the life of the bearings and is less burdensome than the conventionally used clean out of place (COP) system in which the auger is manually disassembled for cleaning the bearings.

Referring first to FIGS. 1-6, an exemplary auger assembly 1 for receiving particles of cheese curd and conveying the particles of cheese curd downstream along a cheese processing line is shown. The auger assembly 1 includes an auger housing 2 that is configured to surround and support a first auger 3 and a second auger 4, such that the auger assembly 1 may be a dual auger assembly. In particular applications, only one auger may be provided or more than two augers may be provided. The first auger 3 has a first shaft 5 and the second auger 4 has a second shaft 6. The first shaft 5 and the second shaft 6 each extend through the auger housing 2. The auger housing 2 may have any suitable shape, and the auger housing 2 may be at least partially cylindrical in shape such that the cylindrical portion of the housing 2 surrounds the shafts 5, 6.

Figure 2:
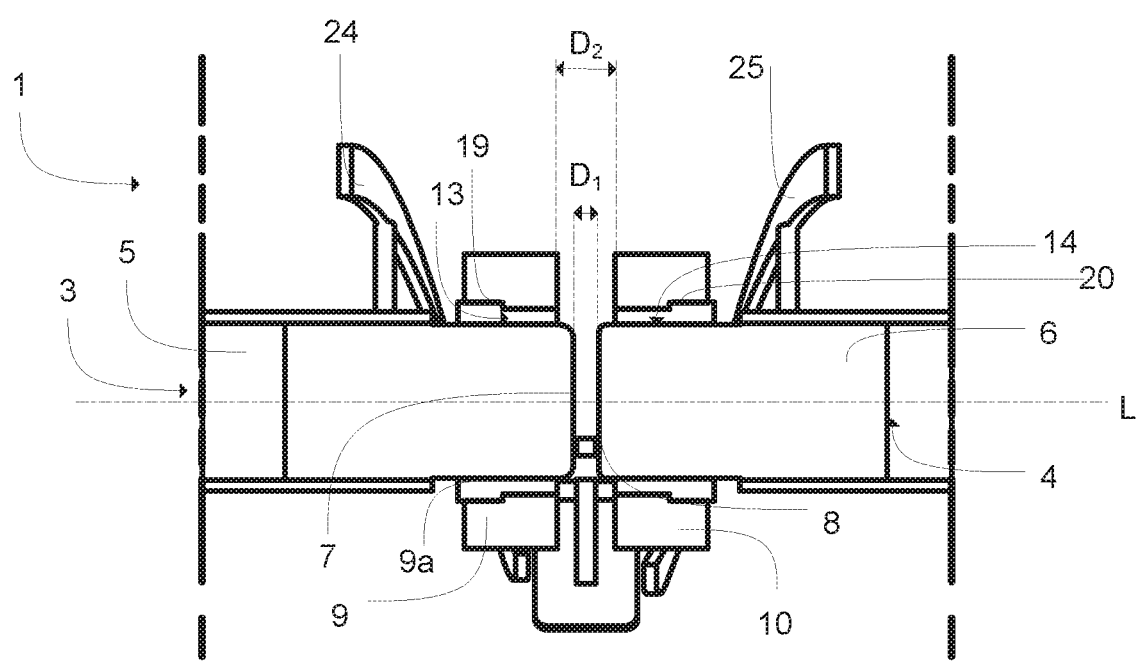
FIG. 2 is a top sectional view of the auger assembly shown in FIG. 1.

As best shown in FIG. 2, the first shaft 5 and the second shaft 6 are colinearly arranged and rotatable about a common longitudinal axis L. The first shaft 5 has an end 7 that faces an end 8 of the second shaft 6. The end 7 and the end 8 may be axially spaced from each other by a predetermined distance $D_1$ such that the first shaft 5 and the second shaft 6 are also axially spaced by the predetermined distance $D_1$, which may be any suitable distance. For example, the predetermined distance $D_1$ may be between 0.51 centimeters (0.20 inches) and 0.76 centimeters (0.30 inches). Spacing the first shaft 5 and the second shaft 6 relative to each other enables the first auger 3 and the second auger 4 to operate independently from each other. Independent operation of the augers 3, 4 enables travel of cheese curd particles on both sides of the auger assembly 1.

The first auger 3 has a first bearing 9 that is removably mounted to the auger housing 2 and arranged at the end 7 of the first shaft 5. Similarly, the second auger 4 has a second bearing 10 that is removably mounted to the auger housing 2 and arranged at the end 8 of the second shaft 6. The bearings 9, 10 are arranged for mounting the first shaft 5 and the second shaft 6 within the auger housing 2. The bearings 9, 10 are non-rotatable and each of the shafts 5, 6 are rotatable relative to the respective bearing 9, 10. The first bearing 9 and the second bearing 10 are colinear and arranged along the longitudinal axis L. The first and second bearings 9, 10 face each other and are spaced by a predetermined distance $D_2$ which is greater than the distance $D_1$ between the ends 7, 8 of the first and second shafts 5, 6. The predetermined distance $D_2$ may be between 2.54 centimeters (1.00 inches) and 3.05 centimeters (1.20 inches).

The first and second bearings 9, 10 may be in the form of a bushing that is formed of any suitable material. For example, the first and second bearings 9, 10 may be formed of a plastic material. The first and second bearings 9, 10 may have a similar shape and similar dimensions. The first and second bearings 9, 10 may be cylindrical in shape or ring-shaped and have an axial length that is between 4.83 centimeters (1.90 inches) and 5.33 centimeters (2.10 inches). The diameter of the first and second bearings 9, 10 may be between 17.8 centimeters (7.00 inches) and 22.9 centimeters (9.00 inches). As best shown in FIG. 2, the first and second bearings 9, 10 are connected with the respective shaft 5, 6 using any suitable connection. For example, the first and second bearings 9, 10 may have a press fit or slip fit connection with the first and second shafts 5, 6 in which an inner diameter 9a of each bearing 9, 10 is fitted over the outer diameter of the respective shaft 5, 6.

Figure 3:
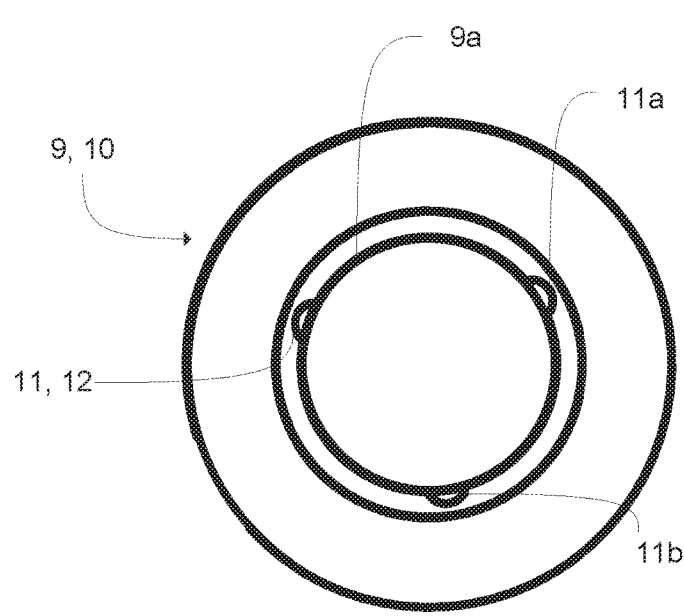
FIG. 3 is a front sectional view of a bearing of the auger assembly shown in FIG. 1.
Figure 4:
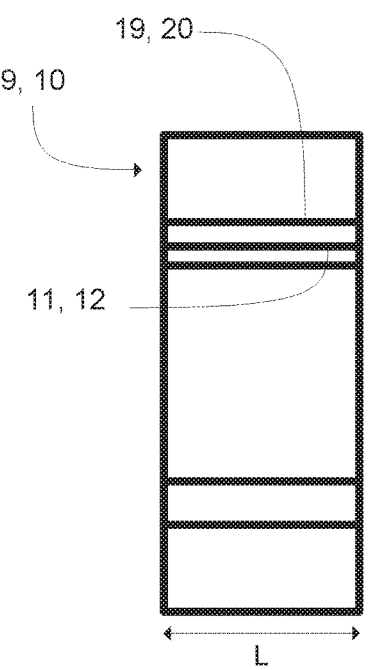
FIG. 4 is a side sectional view of the bearing shown in FIG. 3.

At least one slotted groove 11, 12 is formed in each of the first bearing 9 and the second bearing 10 for receiving and providing the CIP fluid to the bearings 9, 10, as shown in FIGS. 3 and 4. Each bearing 9, 10 may have at least one slotted groove 11, 12 or a plurality of slotted grooves 11, 11a, 11b, 12. The plurality of slotted grooves 11, 11a, 11b may be equidistantly spaced about the inner diameter 9a of each of the bearings 9, 10. Each slotted groove 11, 11a, 11b, 12 may extend radially outwardly from the inner diameter 9a and have any suitable shape, such as a hemispherical shape. As shown in FIG. 4, the slotted grooves 11, 11a, 11b, 12 may be through-holes that extend through an entire longitudinal length L of the respective bearing 9, 10.

Figure 5:
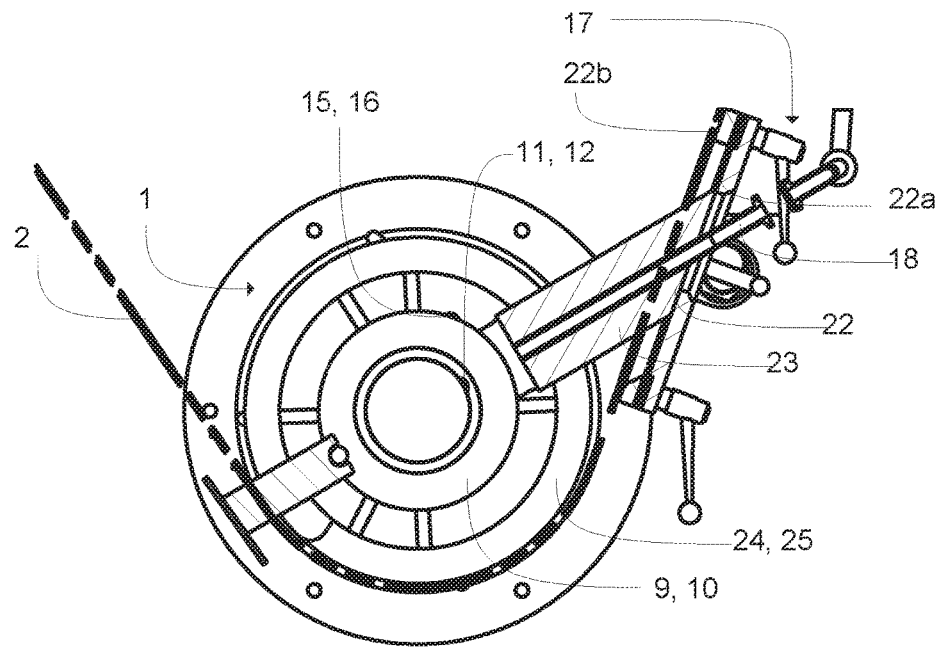
FIG. 5 is a front sectional view of the auger assembly shown in FIG. 1.
Figure 6:
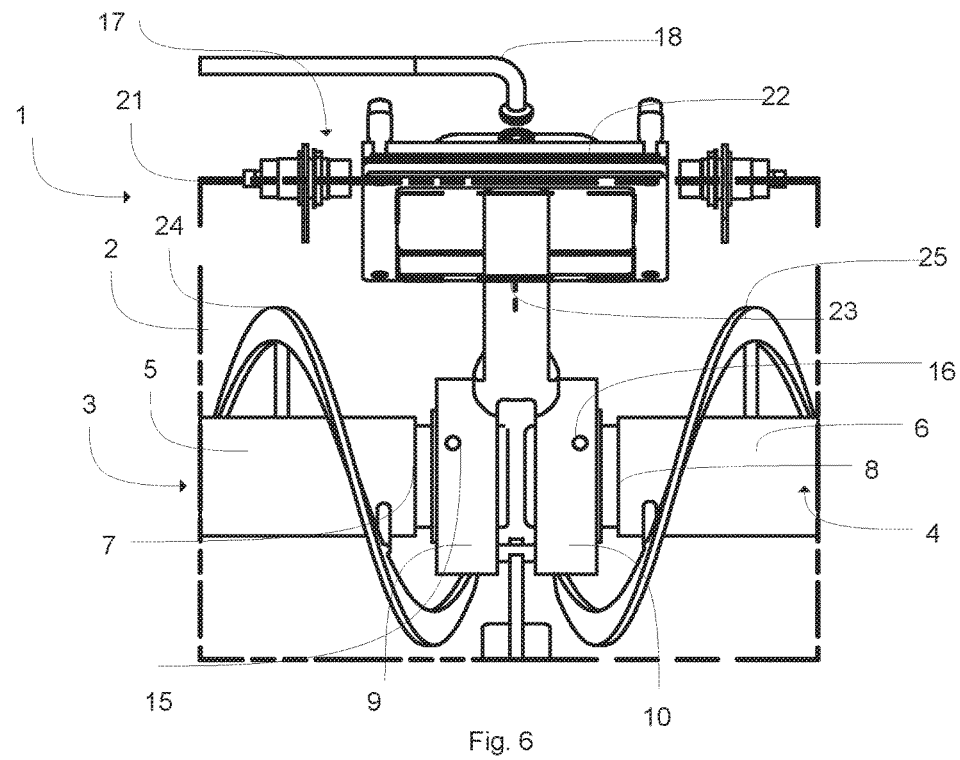
FIG. 6 is a detailed sectional view of colinear bearings and a mounting bracket for the bearings of an auger assembly like the auger assembly shown in FIG. 1.

Forming the slotted grooves 11, 11a, 11b, 12 to extend through the entire length L of the bearings 9, 10 is advantageous in that the CIP fluid is able to flow through the slotted grooves 11, 11a, 11b, 12 along the inner diameter 9a of each of the bearings 9, 10. As shown in FIG. 2, the CIP fluid flows to contact surfaces 13, 14 between the inner diameter 9a of each of the bearings 9, 10 and the outer diameter of the each of the shafts 5, 6 in the area of the slip fit connection where the contact surfaces 13, 14 meet to form the slip fit connection between the bearings 9, 10 and the shafts 5, 6. The slotted grooves 11, 11a, 11b, 12 also provide pressure relief through the bearings 9, 10 during normal operation of the augers 3, 4 in the auger assembly 1. As best shown in FIGS. 1, 5 and 6, each of the bearings 9, 10 further include at least one locating pin 15, 16 that is provided in each bearing 9, 10 for preventing the bearings 9, 10 from rotating. The locating pins 15, 16 extend radially through the first and second bearings 9, 10. The locating pins 15, 16 may be secured to the respective bearing 9, 10 by seal welding a top of the pins 15, 16.

The first and second bearings 9, 10 are attached to a mounting bracket 17 that is secured to the auger housing 2. The first and second bearings 9, 10 may be attached to a first face of the mounting bracket 17 and an opposing face of the mounting bracket 17 may be removably attachable or mountable to the auger housing 2, as shown in FIG. 1. Arranging the bearings 9, 10 and the mounting bracket 17 to be removable relative to the auger housing 2 is advantageous in that the mounting bracket 17 may be mounted to an external door of the auger housing 2, such that the bearings 9, 10 are easily removable and replaceable within the auger assembly 1 through the external door. The mounting bracket 17 is also arranged to support a cleaning line or CIP fluid line 18 that is connected between the auger assembly 1 and a remotely arranged fluid source for supplying the CIP fluid to the auger assembly 1, and particularly to the first and second bearings 9, 10. As shown in FIGS. 1, 5 and 6, the CIP fluid line 18 may be in the form of any suitable tubing, hose, or other fluid transfer device. Supporting the CIP fluid line 18 within the mounting bracket 17 ensures that the CIP fluid line 18 is in a fixed position in which the CIP fluid line 18 is arranged to direct the CIP fluid to the slotted grooves 11, 12 and the area in which the slip fit connection between the bearings 9, 10 and the shafts 5, 6 is formed.

The bearings 9, 10 are secured against the mounting bracket 17 when assembled within the auger assembly 1. For example, the bearings 9, 10 may be retained against the mounting bracket 17 by radially extending shoulders 19, 20 of the bearings 9, 10, as shown in FIGS. 2 and 4. Providing the bearings 9, 10 with the shoulders 19, 20 or any other suitable feature prevents thrust loading from displacing the bearings 9, 10 out of engagement and retainment within the mounting bracket 17 during operation of the auger assembly 1. As shown in FIGS. 1, 5 and 6, the mounting bracket 17 may be attached to a wall 21 of the auger housing 2 by a plate 22 of the mounting bracket 17. The plate 22 may have any suitable shape, such as rectangular, and a first face 22a that is removably attached to the wall 21 of the auger housing 2 and a second face 22b opposing the first face 22a. The plate 22 may be secured to the housing 2 using any suitable fastening mechanism. Examples of suitable fastening mechanisms may include bolts, screws, or clamps.

A mounting arm 23 may be attached to the second face 22b of the plate 22 of the mounting bracket 17. The mounting arm 23 extends from the plate 22 to the first and second bearings 9, 10 to connect the bearings 9, 10 to the auger housing 2 during normal operation of the auger assembly 1. The mounting arm 23 may be arranged at an angle relative to the plate 22 and the CIP fluid line 18 may extend through the mounting arm 23. The CIP fluid line 18 and the mounting arm 23 may be arranged concentrically such that the CIP fluid line 18 is also arranged at an angle relative to the plate 22. The CIP fluid line 18 is arranged to extend internally through the mounting arm 23 and externally away from the auger housing 2.

Figure 7:
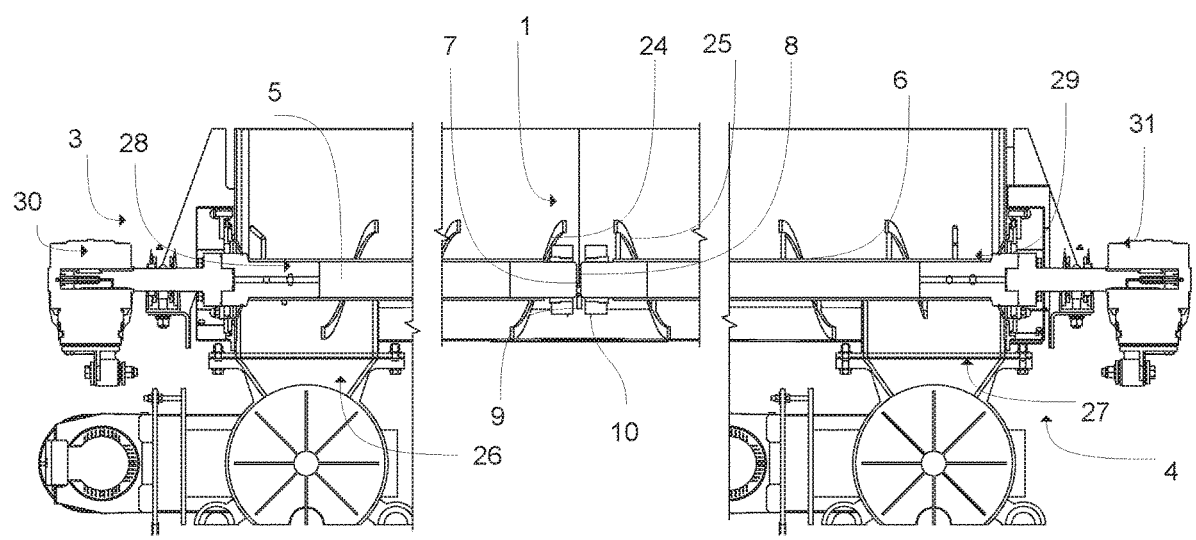
FIG. 7 is a sectional view of a conveying auger that includes the auger assembly shown in FIG. 1.
Figure 8:
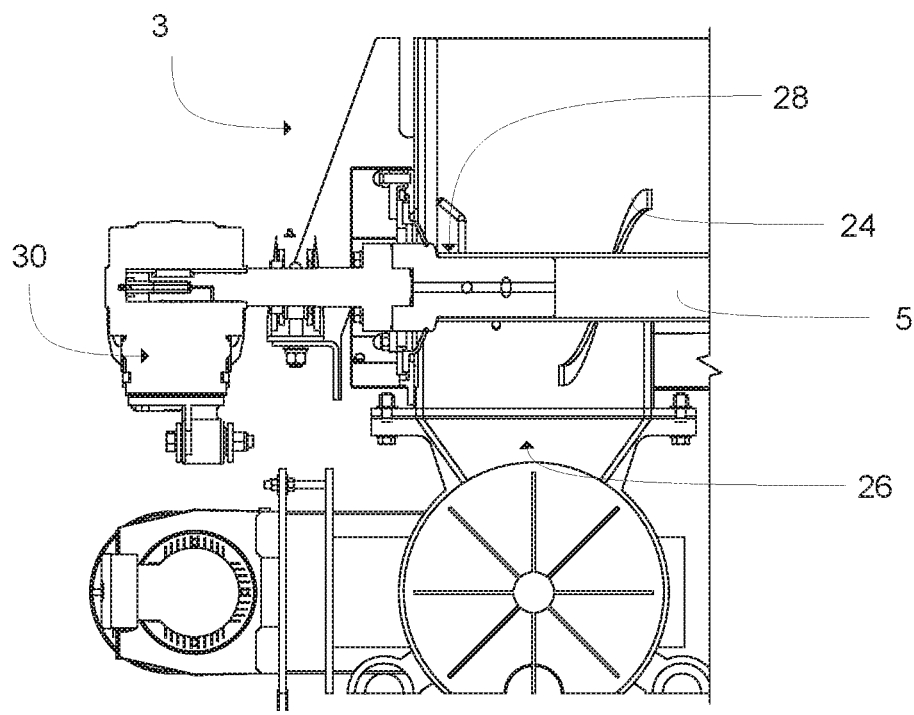
FIG. 8 is a detailed sectional view of a first side of the conveying auger shown in FIG. 7.
Figure 9:
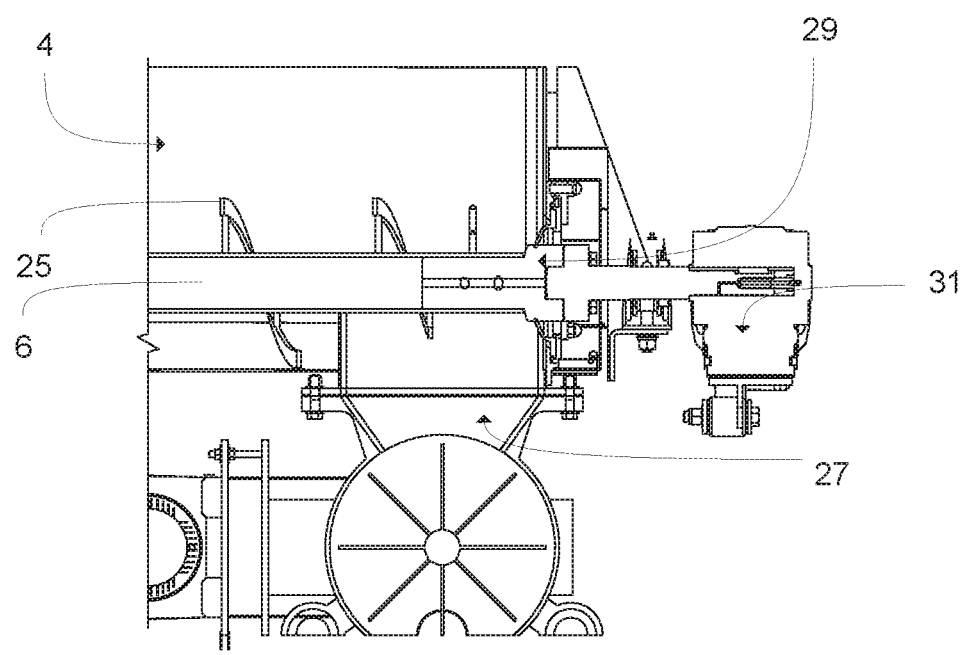
FIG. 9 is a detailed sectional view of a second side opposite the first side of the conveying auger shown in FIG. 7.

Referring in addition to FIGS. 7-9, portions of the entire auger assembly are shown in FIG. 7, FIG. 8 shows a detailed view of a portion of the first auger 3, and FIG. 9 shows a detailed view of a portion of the second auger 4. The auger assembly 1 further includes a plurality of helical or spiral flights 24, 25 that are attached to the shafts 5, 6 for rotation with the shafts 5, 6. The first shaft 5 of the first auger 3 has a first spiral flight 24 attached to the first shaft 5 and the second shaft 6 of the second auger 4 has a second spiral flight 25 attached to the second shaft 6. The first flight 24 and the second flight 25 may be symmetrical to each other. As best shown in FIG. 7, the flights 24, 25 may extend along a length of the respective shaft 5, 6 and the augers 3, 4 are operable independently from each other. Each auger 3, 4 includes an outlet 26, 27 for expelling the cheese curd out of the respective auger 3, 4. The first outlet 26 of the first shaft 5 is arranged at an opposite end 28 of the first shaft 5 opposite the end 7 that faces the end 8 of the second shaft 6. The second outlet 27 of the second shaft 6 is arranged at an opposite end 29 of the second shaft 6 opposite the end 8 that faces the end 7 of the first shaft 5. The outlets 26, 27 are in communication between the auger assembly 1 and a downstream location along the cheese processing line for conveying the cheese curd downstream.

The shafts 5, 6 are driven by any suitable drive mechanism of the auger assembly 1. Each auger 3, 4 may have a drive system that enables the shafts 5, 6 to be driven independently from each other. The shafts 5, 6 may be driven hydraulically, pneumatically, electrically, or any combination thereof, and the drive mechanism may include a motor, such as a gearmotor. A first drive 30 may be arranged at the opposite end 28 of the first shaft 5 for driving the first shaft 5 and a second drive 31 may be arranged at the opposite end 29 of the second shaft 6 for driving the second shaft 6. The shafts 5, 6 are rotatably coupled to the drives 30, 31. The shafts 5, 6 may be coupled to motors of the drives 30, 31 using shrouds, splined connections, or any other suitable connections.

Figure 10:
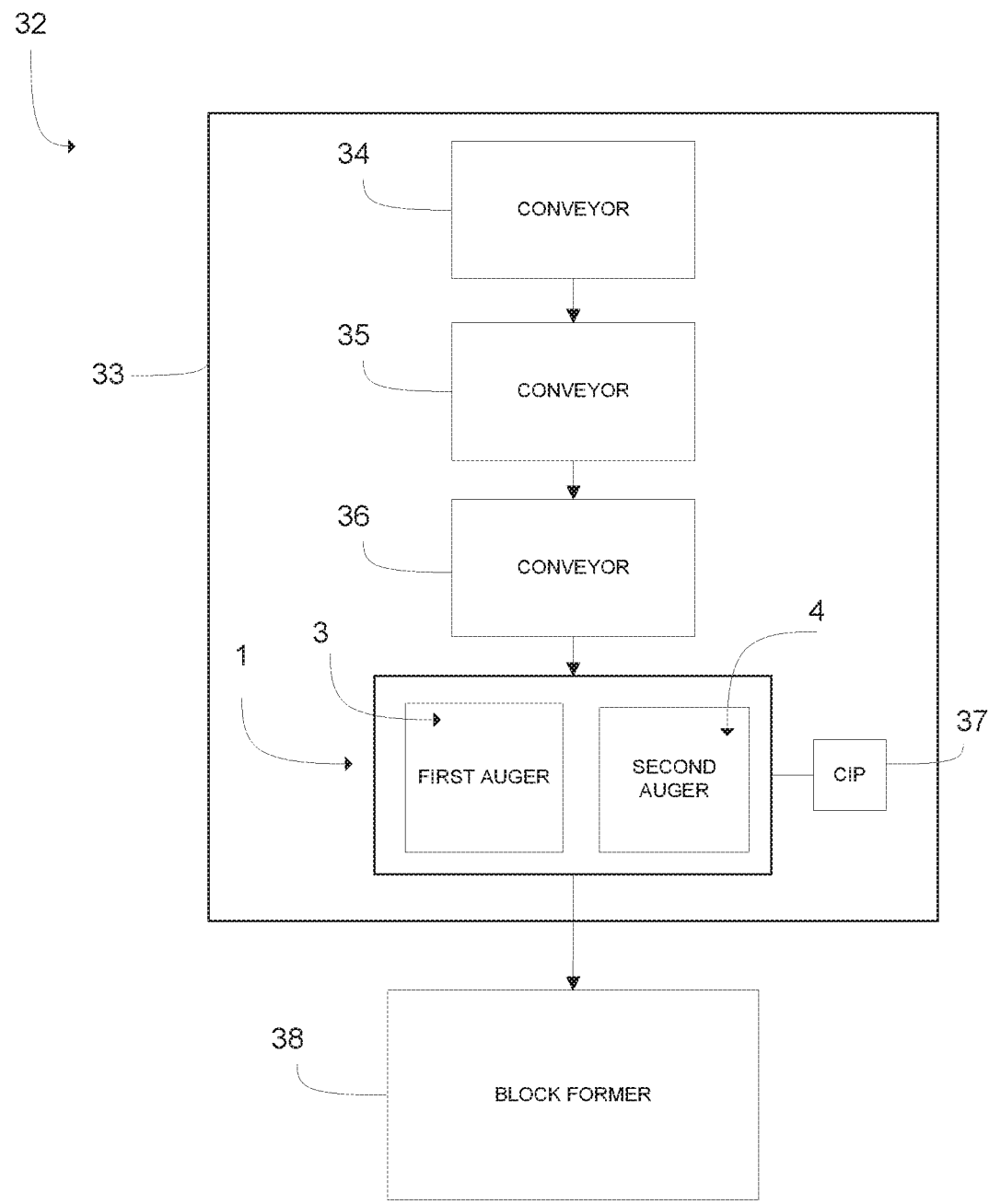
FIG. 10 is a schematic drawing showing an exemplary cheese processing line.

Referring in addition to FIG. 10, the auger assembly 1 having the first auger 3 and the second auger 4 may be arranged along a cheese processing line 32 as part of a machine 33. For example, the machine 33 may be a cheddaring machine for producing a cheddar type cheese that includes a plurality of conveyors or auger assemblies 1, 34, 35, 36 that are individually driven at pre-set and adjustable speeds. For example, four conveyors may be used. Each auger assembly 1, 34, 35, 36 may be mounted above each other within a frame of the machine 33. The first conveyor 34 may be configured to receive particles of cheese curd which has been drained of whey from a location upstream of the machine 33 along the cheese processing line 32. The first conveyor 34 may include stirrers for further whey drainage. The cheese curd particles are then transferred to the second conveyor 35 which enables the beginning of the matting and fusing of the cheese curd. The third conveyor 36 receives the cheese curd from the second conveyor 35 for cheddaring.

At the end of the third conveyor 36, the cheese curd may be milled to chips of uniform size which are then received by the next conveyor, which is a mellowing conveyor that includes an auger assembly similar to the auger assembly 1 having the first auger 3 and the second auger 4. The auger assembly 1 may also be used in any earlier conveyor, such as a conveyor used in draining the cheese curd before reaching the first conveyor 34. The auger assembly 1 may also be suitable for use in other cheese processing lines used to produce types of cheese other than cheddar. During the movement of the cheese curd from the third conveyor 36 to the mellowing conveyor, or auger assembly 1, salt is added to the cheese curd and remains on the cheese curd for diffusing into the cheese curd. The cheese curd may be further stirred during the mellowing process to prevent the cheese from fusing and to promote an even absorption of salt. The auger assembly 1 may also be suitable for use in a cheese production line that uses cheddaring but in which the milled chips are not salted, such as in the production of mozzarella and pizza cheeses.

During the movement of the cheese curd within the mellowing conveyor, a CIP system 37 that is in fluid communication with the auger assembly 1, such as by using the CIP fluid line 18 (shown in FIG. 5), is actuated and operable for cleaning the bearings 9, 10 (shown in FIGS. 1-6). The CIP system 37 may be configured to operate automatically for cleaning the bearings 9, 10 or cleaning the bearings 9, 10 at predetermined intervals during operation of the auger assembly 1. The CIP system 37 may also be manually activated. Using the CIP system 37 and forming the bearings 9, 10 to have the slotted grooves as described herein enables an automated CIP cleaning of the auger assembly 1 and the bearing components during normal operation of the auger assembly 1 to promote cleaning and sanitation of the bearings 9, 10 or other components of the auger assembly 1 without having to disassemble the auger assembly 1.

Figure 11:
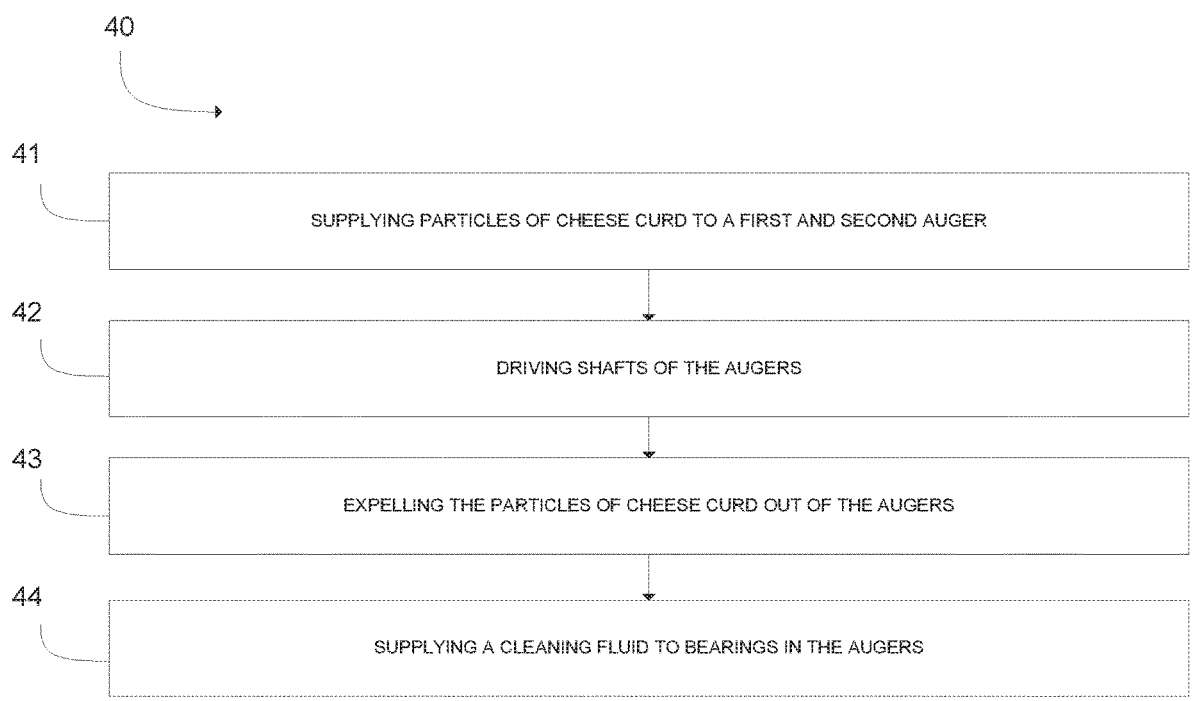
FIG. 11 is a flow chart of a method of operating an auger assembly like the auger assembly of FIG. 1 to convey cheese curd downstream along a cheese processing line.

Referring now to FIG. 11, a method 40 for operating an auger assembly 1 (shown in FIG. 1) arranged to rotate a first auger 3 and a second auger 4 to convey cheese curd downstream along a cheese processing line 32 (shown in FIG. 10) is schematically shown. A first step 41 of the method 40 includes supplying particles of cheese curd to the first auger 3 and the second auger 4 that are colinearly arranged in the auger assembly 1. The particles of cheese curd may be received from a previous conveyor 36 (shown in FIG. 10). When the particles of cheese curd are supplied to the auger assembly, a second step 42 of the method 40 includes driving a first shaft 5 of the first auger 3 and a second shaft 6 of the second auger 4. The shafts 5, 6 are independently driven relative to each either using a corresponding drive 30, 31 (shown in FIG. 7). The particles of cheese curd travel along each of the augers 3, 4 toward the outlets 26, 27 (shown in FIG. 7) of the respective auger 3, 4.

After the particles of cheese curd have travelled along the augers 3, 4, a third step 43 of the method 40 includes expelling the particles of cheese curd through the outlets 26, 27 at an end of the first auger 3 and at an end of the second auger 4 to convey the particles of cheese curd downstream along the cheese processing line 32. A fourth step 44 of the method 40 includes supplying a cleaning fluid, such as a CIP fluid, directly to bearings 9, 10 in the first and second auger 3, 4 that are arranged for mounting the first and second rotatable shaft 5, 6 within the auger housing 2. Directing the CIP fluid to the contact surfaces 13, 14 of the bearings 9, 10 may improve the life of the bearings 9, 10 and ensure sanitation of the components in the auger assembly 1 during the production of cheese.

According to an aspect of the invention, an auger assembly is used for receiving particles of cheese curd and conveying the particles of cheese curd downstream along a cheese processing line. The auger assembly includes an auger housing, a first auger having a first shaft extending through the auger housing, a second auger having a second shaft extending through the auger housing and arranged colinearly with the first shaft, a first bearing mounted to the auger housing and arranged at the end of the first shaft, and a second bearing mounted to the auger housing and arranged at the end of the second shaft. The second shaft has an end that faces an end of the first shaft, and the first bearing and second bearing are colinear and face each other. At least one slotted groove is formed in each of the first bearing and the second bearing to enable a cleaning fluid to contact a surface of the respective bearing.

The at least one slotted groove may extend through an entire longitudinal length of the respective bearing.

The first and second bearing may each have a slip fit connection with the first and second shaft, respectively.

The first shaft and the second shaft may be axially spaced from each other by a predetermined distance.

The first and second bearing may be fixedly secured to the auger housing and the first and second shaft may be rotatable relative to the first and second bearing within the auger housing.

The auger assembly may include at least one locating pin arranged on each of the first and second bearing.

The at least one locating pin may be seal welded to each of the first and second bearing.

The auger assembly may include a mounting bracket that is attached to the first and second bearing.

The auger assembly may include a cleaning fluid line that is supported by the mounting bracket to direct the cleaning fluid to the at least one slotted groove formed in each of the first and second bearing.

Each of the first and second bearing may have a radially extending shoulder to retain the first and second bearing against the mounting bracket.

The mounting bracket and the first and second bearing may be removably attachable to the auger housing.

The mounting bracket may include a plate attached to a wall of the auger housing and a mounting arm extending from the plate to the first and second bearing.

The auger assembly may further include a first spiral flight attached to the first shaft, a second spiral flight attached to the second shaft, a first outlet arranged at an opposite end of the first shaft opposite the end that faces the end of the second shaft, and a second outlet arranged at an opposite end of the second shaft opposite the end that faces the end of the first shaft.

The auger assembly may further include a first drive that is arranged at the opposite end of the first shaft for driving the first shaft, and a second drive that is arranged at the opposite end of the second shaft for driving the second shaft.

According to another aspect of the invention, a method for operating an auger assembly arranged to rotate a first auger and a second auger to convey cheese curd downstream along a cheese processing line includes supplying particles of cheese curd to the first auger and the second auger that are colinearly arranged, driving a first shaft of the first auger and a second shaft of the second auger, expelling the particles of cheese curd through outlets at an end of the first auger and at an end of the second auger to convey the particles of cheese curd downstream along the cheese processing line, and supplying a cleaning fluid directly to bearings in the first and second auger that are arranged for mounting the first and second shaft within an auger housing.

While the invention has been described with reference to one or more preferred features, which features have been set forth in considerable detail for the purposes of making a complete disclosure of the invention, such features are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. An auger assembly for receiving particles of cheese curd and conveying the particles of cheese curd downstream along a cheese processing line, the auger assembly comprising:

an auger housing, a first auger having a first shaft extending through the auger housing, a second auger having a second shaft extending through the auger housing and arranged colinearly with the first shaft, the second shaft having an end that faces an end of the first shaft, a first bearing mounted to the auger housing and arranged at the end of the first shaft, and a second bearing mounted to the auger housing and arranged at the end of the second shaft, the first bearing and second bearing being colinear and facing each other, and at least one slotted groove formed in each of the first bearing and the second bearing to enable a cleaning fluid to contact a surface of the respective bearing.

2. The auger assembly according to claim 1, wherein the at least one slotted groove extends through an entire longitudinal length of the respective bearing.

3. The auger assembly according to claim 1, wherein the first and second bearing each have a slip fit connection with the first and second shaft, respectively.

4. The auger assembly according to claim 1, wherein the first shaft and the second shaft are axially spaced from each other by a predetermined distance.

5. The auger assembly according to claim 1, wherein the first and second bearing are fixedly secured to the auger housing and the first and second shaft are rotatable relative to the first and second bearing within the auger housing.

6. The auger assembly according to claim 1, further comprising at least one locating pin arranged on each of the first and second bearing.

7. The auger assembly according to claim 6, wherein the at least one locating pin is seal welded to each of the first and second bearing.

8. The auger assembly according to claim 1, further comprising a mounting bracket that is attached to the first and second bearing.

9. The auger assembly according to claim 8, further comprising a cleaning fluid line that is supported by the mounting bracket to direct the cleaning fluid to the at least one slotted groove formed in each of the first and second bearing.

10. The auger assembly according to claim 8, wherein each of the first and second bearing has a radially extending shoulder to retain the first and second bearing against the mounting bracket.

11. The auger assembly according to claim 8, wherein the mounting bracket and the first and second bearing are removably attachable to the auger housing.

12. The auger assembly according to claim 8, wherein the mounting bracket includes a plate attached to a wall of the auger housing and a mounting arm extending from the plate to the first and second bearing.

13. The auger assembly according to claim 1, further comprising:

a first spiral flight attached to the first shaft, a second spiral flight attached to the second shaft, a first outlet arranged at an opposite end of the first shaft opposite the end that faces the end of the second shaft, and a second outlet arranged at an opposite end of the second shaft opposite the end that faces the end of the first shaft.

14. The auger assembly according to claim 13, further comprising:

a first drive that is arranged at the opposite end of the first shaft for driving the first shaft, and a second drive that is arranged at the opposite end of the second shaft for driving the second shaft.

15. A method for operating an auger assembly arranged to rotate a first auger and a second auger to convey cheese curd downstream along a cheese processing line, the method comprising:

supplying particles of cheese curd to the first auger and the second auger that are colinearly arranged, driving a first shaft of the first auger and a second shaft of the second auger, expelling the particles of cheese curd through outlets at an end of the first auger and at an end of the second auger to convey the particles of cheese curd downstream along the cheese processing line, and supplying a cleaning fluid directly to bearings in the first and second auger that are arranged for mounting the first and second shaft within an auger housing.

* * * * *